United States Patent
Wakayama et al.

(10) Patent No.: US 7,016,373 B2
(45) Date of Patent: Mar. 21, 2006

(54) PACKET SWITCHING APPARATUS

(75) Inventors: Koji Wakayama, Cannes (FR); Ken'ichi Sakamoto, Kokubunji (JP); Hiroaki Miyata, Yokohama (JP); Shiro Tanabe, Hidaka (JP)

(73) Assignee: Hitachi, Ltd., Tokyo (JP)

( * ) Notice: Subject to any disclaimer, the term of this patent is extended or adjusted under 35 U.S.C. 154(b) by 825 days.

(21) Appl. No.: 09/940,447

(22) Filed: Aug. 29, 2001

(65) Prior Publication Data
US 2002/0167938 A1 Nov. 14, 2002

(30) Foreign Application Priority Data
May 11, 2001 (JP) .............................. 2001-141299

(51) Int. Cl.
*H04L 12/66* (2006.01)
(52) U.S. Cl. .................................................... 370/463
(58) Field of Classification Search ................ 370/264, 370/352, 386, 389, 392, 401, 463, 466
See application file for complete search history.

(56) References Cited

U.S. PATENT DOCUMENTS

| | | | | |
|---|---|---|---|---|
| 5,812,639 A | * | 9/1998 | Bartholomew et al. | 370/352 |
| 5,959,988 A | * | 9/1999 | Bjorkman et al. | 370/389 |
| 6,034,954 A | | 3/2000 | Takase et al. | |
| 6,377,571 B1 | * | 4/2002 | Tai | 370/355 |

* cited by examiner

*Primary Examiner*—Kwang Bin Yao
(74) *Attorney, Agent, or Firm*—Reed Smith LLP; Stanley P. Fisher, Esq.; Juan Carlos A. Marquez, Esq.

(57) ABSTRACT

A packet switching apparatus is constructed by a basic module disposed in the apparatus casing and an additional module disposed on the outside of the apparatus casing. The basic module has a common processing function irrespective of an access method and a service type, an interface accommodating lines to be connected to the Internet, and a plurality of interface boards conformed to a specific access method by which a hardware scale may be small. Only the basic module functions as a packet switching apparatus, and a processing function peculiar to each access method and service type is executed by the additional module.

8 Claims, 11 Drawing Sheets

FIG. 11

| ACCESS METHOD 301 | FUNCTION ON ADDITIONAL MODULE 302 | FUNCTION SPECIFIC TO SERVICE ON BASIC MODULE 303 | COMMON FUNCTION ON BASIC MODULE 304 |
|---|---|---|---|
| ANALOG CIRCUIT | MODEM | (NOT APPLICABLE) | • PPP PROCESSOR<br>• IP LAYER PROCESSOR<br>• PACKET SWITCHING<br>• SYSTEM CONTROL FUNCTION |
| ISDN | (NOT APPLICABLE) | ISDN TERMINATION | |
| ADSL | DSLAM | (NOT APPLICABLE) | |
| CATV | CMTS | (NOT APPLICABLE) | |
| LEASED LINE | ENCRYPTION | (NOT APPLICABLE) | |

PACKET SWITCHING APPARATUS

BACKGROUND OF THE INVENTION

1. Field of the Invention

The present invention relates to a packet switching apparatus and, more particularly, to a gateway for connecting an access network to which user or subscriber terminals are connected and the Internet or an Internet service provider.

2. Description of the Related Art

There are various types of communication lines for accessing the Internet from a terminal such as a personal computer. A dial-up access to the Internet is shifting from a method using an analog telephone line to the ISDN (Integrated Services Digital Network) method enabling higher-speed communication. Recently, access methods, such as a method of using an ADSL (Asymmetric Digital Subscriber Line) and an optical access method using an FTTH (Fiber To The Home) which have a communication speed of 1 Mbit/s or higher are also coming into wide use. Other than an access from a fixed terminal installed at home, office, or the like, the Internet can be accessed also from a mobile terminal such as a portable telephone.

A packet switching apparatus (hereinbelow, called an access node) for relaying a plurality of different kinds of communication lines of different access methods to the Internet has to have not only common processing functions common to the various access methods but also individual processing functions peculiar to each of the access methods.

Examples of the processes common to the various access methods are a PPP (Point to Point Protocol) process for authenticating a subscriber, determining a communication path, and the like, an IP (Internet Protocol) layer process for determining the destination of a packet, and a switching process for switching a packet to a proper output interface determined by the destination. Examples of the processes peculiar to the access methods are a modem (modulation and demodulation) process in an analog line dial-up, and a process of a DSLAM (Digital Subscriber Line Access Multiplexer) in the ADSL.

In addition to a change in the access method, communication service in the Internet is also becoming various. Recently, a VoIP (Voice over Internet Protocol) for performing voice communication on the Internet is also coming into use. In the VoIP communication, it is necessary to convert a voice signal to an IP packet in an access node (gateway) for connecting a leased line network or PSTN (Public Switched Telephone Network) and the Internet. As a voice coding method, other than the PCM (ITU-T G.711) for transferring a voice signal at 64 kbits/s, for example, compression methods using different bandwidth such as 5.3 kbits/s, 6.4 kbits/s, 16 kbits/s, and 24 kbits/s have been standardized. In the VoIP communication, a process function for an echo canceller is required to each access node in order to prevent deterioration in voice quality.

As described above, an access node of the Internet has to conform to various access methods determined by communication service or a subscriber connection line. In this case, the hardware scale for realizing the individual process varies according to the access method and the type of communication service. Consequently, in the case of making a type of access node conform to a plurality of kinds of access methods, for example, in an access node supporting both a first access method requiring a small hardware scale for its individual process and a second access method requiring a large hardware scale for an individual process, the whole apparatus size depends on the hardware scale of the second access method.

FIG. 12 shows an access node supporting a first access method of a dial-up access using an analog line and a second access method of a dial-up access using the ISDN circuit.

This access node includes a plurality of line interface boards 1-1 to 1-n of the first access method for accommodating analog circuits L11 to Ljn, a line interface board 1-m of the second access method for accommodating an ISDN circuit Lm, a line interface board 2 for connecting to an ISP (Internet Service Provider) network, and a switch 3 for switching packets among the line interface boards.

In the case of making a dial-up access through an analog circuit, the access node has to perform modem termination processes. As modem standards for an analog line, for example, there are various protocols according to communication speeds such as V.90, K56 Flex, V.34+, and the like. Modem processes adapted to these protocols are usually realized by software. In order to accept dial-up accesses of a plurality of channels via analog circuits, a plurality of processors have to be provided in correspondence with the communication lines (channels), and a number of large size or small size of line interface boards adapted to the communication lines have to be inevitably required.

In FIG. 12, a physical layer termination unit 4 for connecting to the analog circuits L11 to L1n and a plurality of processors P11 to P1n corresponding to the analog circuits are mounted on the single line interface board 1-1. With the configuration, for example, by using a 60-by-60 cm board, modem processes of about 150 channels can be performed. For example, in the case of performing the modem processes of about 1000 channels by a single access node, it needs a hardware scale of about seven boards each having the above size.

On the other hand, a dial-up access via the ISDN circuit does not have to conform to a plurality of protocols unlike the modem processes in the analog circuit and does not need a converting process between an analog signal and a digital signal (A/D conversion and D/A conversion) as in the modem process. The line interface board 1-m for the ISDN circuit consequently has a relatively simple structure including the physical layer termination unit 4 and an ISDN termination unit 5. For example, when one channel is calculated as 64 kbits/s, a circuit process of about 4000 channels can be performed with a single board.

SUMMARY OF THE INVENTION

From the above reasons, the casing size of the whole access node placing an importance on the support of the dial-up access via the analog circuit becomes large inevitably. The Internet is generally accessed by the dial-up via the analog circuit formerly, but a method of higher communication speed such as the dial-up via the ISDN circuit and the optical access method using the ADSL or FTTH are becoming popular recently.

The access node is requested to have such a structure that is matching the needs of the markets and capable of promptly responding to a change in communication service. In this case, there are problems such that when an apparatus matching each of various needs is designed each time, reduction in manufacturing costs is obstructed. For example, when a part of circuit boards in an existing access node supporting an analog circuit is replaced by a circuit board matching a customer demand, the casing size cannot be reduced.

An object of the invention is to provide a small size of packet switching apparatus having high extensibility promptly adapted to various access methods.

Another object of the invention is to provide an access node of which function can be easily changed according to necessity.

In order to achieve the objects, the invention is characterized in that a packet switching apparatus accommodating a group of first communication lines of different access methods for performing communication with subscriber terminals and a second communication line for connection to the Internet includes a basic module disposed in the apparatus casing and an additional module disposed on the outside of the apparatus casing.

The basic module has, for example, common processing functions which are not related to an access method and a service type, such as a PPP process, an IP layer process, and a packet switching process. By making the basic module include, as a basic model, an interface board for accommodating an Internet connection line and a plurality of interface boards conformed to a specific access method having high market needs and requiring a small hardware scale like the ISDN, the basic module itself is allowed to function as the packet switching apparatus.

Concretely, the basic module comprises: a plurality of packet processors each for performing a predetermined protocol process on communication packets; a switch for switching packets among the packet processors; a first line interface connected between one of the packet processors and a communication line having a specific access method in the first communication lines; a second line interface connected between one of the packet processors and the second communication line; and a control processor connected to the above elements.

The additional module has a function corresponding to an individual access method and service type. For example, in the case of accommodating an analog circuit, in place of any of the line interfaces in the basic model, an additional module (interface board) having a modem function is connected. In the case of accommodating an ADSL, an interface board having the processing function of the DSLAM is connected as an additional module. In the case of supporting the VoIP communication, an interface board having a voice coding function at various transfer speeds is connected as an additional module. The interface board serving as an additional module is disposed in an arbitrary position on the outside of the apparatus casing.

According to the invention, the casing size of the packet switching apparatus as a basic model can be reduced in size. By connecting an additional module prepared for each access method and each service type to the basic model, the customer needs can be promptly responded.

BRIEF DESCRIPTION OF THE DRAWINGS

FIG. 11 is a diagram showing an example of function sharing between the basic module BM11 and the additional module AM11.

DESCRIPTION OF THE PREFERRED EMBODIMENTS

Embodiments of the invention will be described hereinbelow with reference to the drawings.

Figure 1:
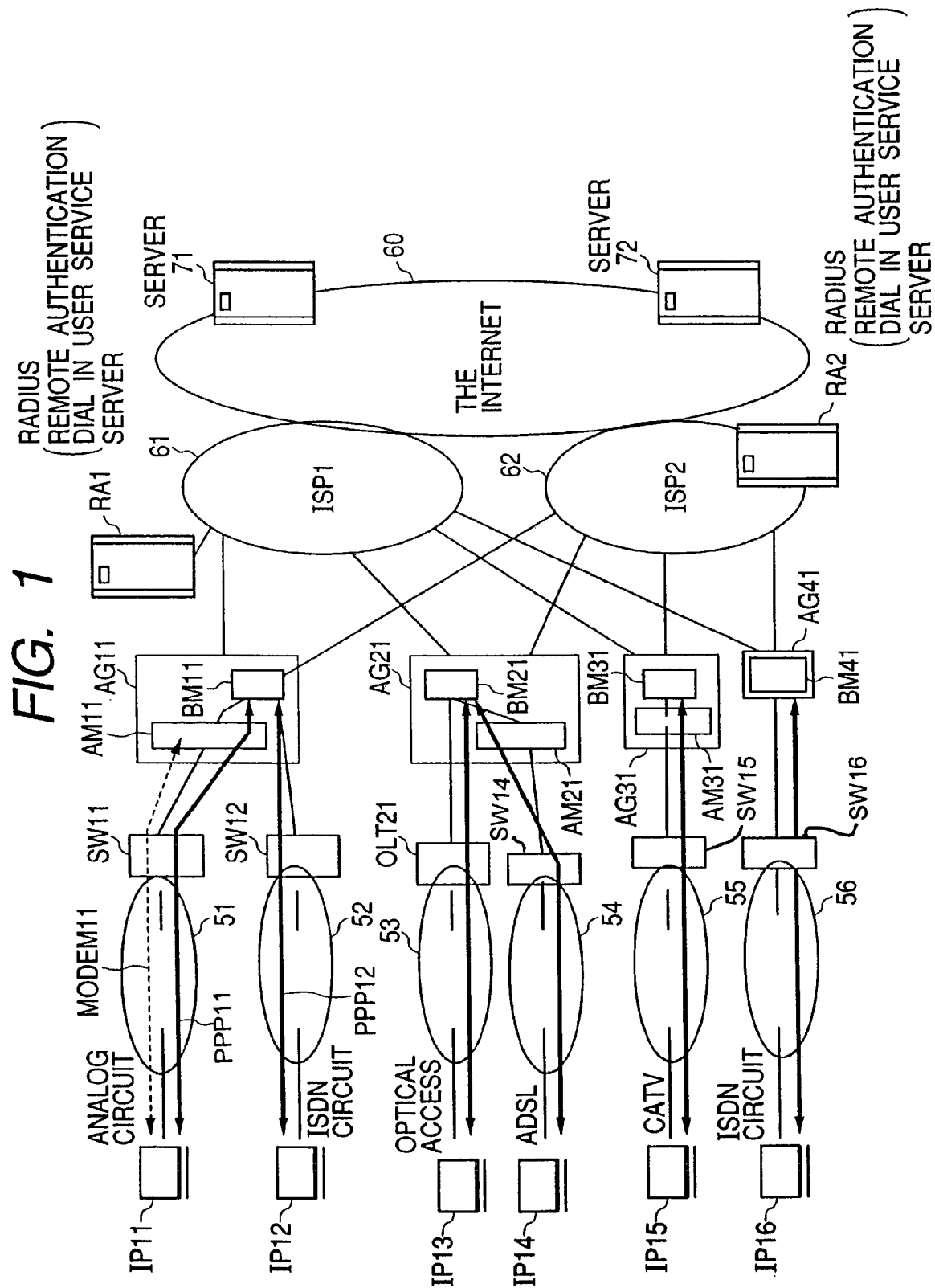
FIG. 1 is a diagram showing an example of a network configuration to which an access node according to the invention is applied.

FIG. 1 shows an example of a network architecture to which an access node of the invention is applied. Shown in the diagram are an analog circuit network 51, ISDN circuit networks 52 and 56, an optical access network 53, an ADSL network 54, a CATV network 55, and subscriber terminals IP11 to IP16 connected to the networks.

The analog circuit network 51 and the ISDN circuit network 52 are connected to an access node AG11 via switches SW11 and SW12, respectively. The optical access network 53 and the ADSL network 54 are connected to an access node AG21 via an optical line terminal OLT 21 and the switch SW14, respectively. The CATV network 55 and the ISDN circuit network 56 are connected to access nodes AG31 and AG41 via switches SW15 and SW16, respectively. The access nodes AG11 to AG41 are connected to the Internet 60 via Internet service provider (ISP) networks 61 and 62. RA1 and RA2 denote RADIUS (Remote Authentication Dial In User Service) servers connected to the ISP networks 61 and 62, respectively, and 71 and 72 denote servers for information service connected to the Internet 60.

According to the invention, to promptly respond to various access methods, the access node is constructed by a basic module and an additional module. For example, the access node AG11 comprises a basic module BM11 for performing a common process and an additional module AM11 for performing a process peculiar to each access method. An access signal from the ISDN network 52 is directly input to the basic module BM11. An access signal from the analog network 51 is input to the basic module BM11 after performing individual process through the additional module 11. Similarly, the access node AG21 comprises a basic module BM21 and an additional module AM21. An access signal from the optical access network 53 is input to the basic module BM21. An access signal from the ADSL network 54 is input to the basic module BM21 after performing individual process through the additional module AM21. An access signal from the CATV network 55 is input to a basic module BM31 after performing individual process through an additional module AM31 in the access node AG31.

In order to connect a subscriber terminal to the Internet via the ISP network, it is necessary to establish a link between the terminal and an access node and execute a control procedure of setting of parameters such as a maximum transfer packet length, authentication of a subscriber, and assignment of an IP address to the subscriber terminal. For example, the subscriber terminal IP11 establishes a link to the access node AG11 on the basis of a link control protocol (LCP) conformed to the RFC1661 and performs a subscriber authenticating process with the RADIUS server of the ISP network to be passed through at the time of connection to the Internet, for example, RA1 of the ISP network 61. The ISP to be passed through is specified by, for example, a control packet for ISP designation sent out from the subscriber terminal IP11 to the access node AG11, so that the access node AG11 can relay transmission packets from the user to a proper ISP. An example of the protocol for subscriber authentication is a CHAP (Challenge Handshake Authentication Protocol) defined by RFC1994.

After the subscriber authentication is normally completed, on the basis of IPCP (IP Control Protocol) defined by RFC1332, a process of controlling an IP layer such as assignment of an IP address to the subscriber terminal is carried out between the subscriber terminal IP11 and the access node AG11. When the control process by the IPCP is completed, a PPP session PPP11 is established between the subscriber terminal IP11 and the access node AG11, and the PPP session and the ISP network 61 are correlated to each other, thereby enabling the subscriber terminal IP11 to access the Internet 60. A session PPP12 between the subscriber terminal IP12 and the access node AG11 is established through a procedure similar to the above.

The process of establishing a PPP session and the process of selectively connecting the access node to the ISP network 61 or 62 are performed in the basic modules BM11 to BM41 in the access nodes. A process peculiar to an access method which cannot be treated by the basic module is carried out by the additional module. For example, in the case of connecting the subscriber terminal IP11 to the access node AG11, a process for a modem signal (MODEM11) is carried out in the additional module AM11. A process for DSLAM in the ADSL network 54 and a CMTS (Cable Modem Termination System) process in the CATV network 55 are similarly executed in the additional modules AM21 and AM31 in the access nodes AG21 and AG31, respectively.

In the case of dial-up connection from the ISDN circuit to the access node, the scale of hardware necessary for a terminating process of the ISDN can be made small. Consequently, by providing the hardware in the basic module, the additional module for the ISDN circuit can be omitted. There is no additional module in the access node AG41 to which the ISDN circuit 56 is connected, and an access signal is directly input to the basic module BM41. For a similar reason, an access signal from the ISDN circuit 52 is directly input to the basic module BM11 in the access node AG11. When the optical line terminal OLT21 accommodating the optical access network 53 and the access node AG21 are connected via an ATM interface, the additional module for optical access can be omitted, and an access signal can be directly input to the basic module BM21.

The configuration of the access node according to the invention will be described in detail hereinbelow by taking the access node AG11 supporting the access methods of dial-up connection from the analog circuit and the ISDN circuit as an example.

Figure 2:
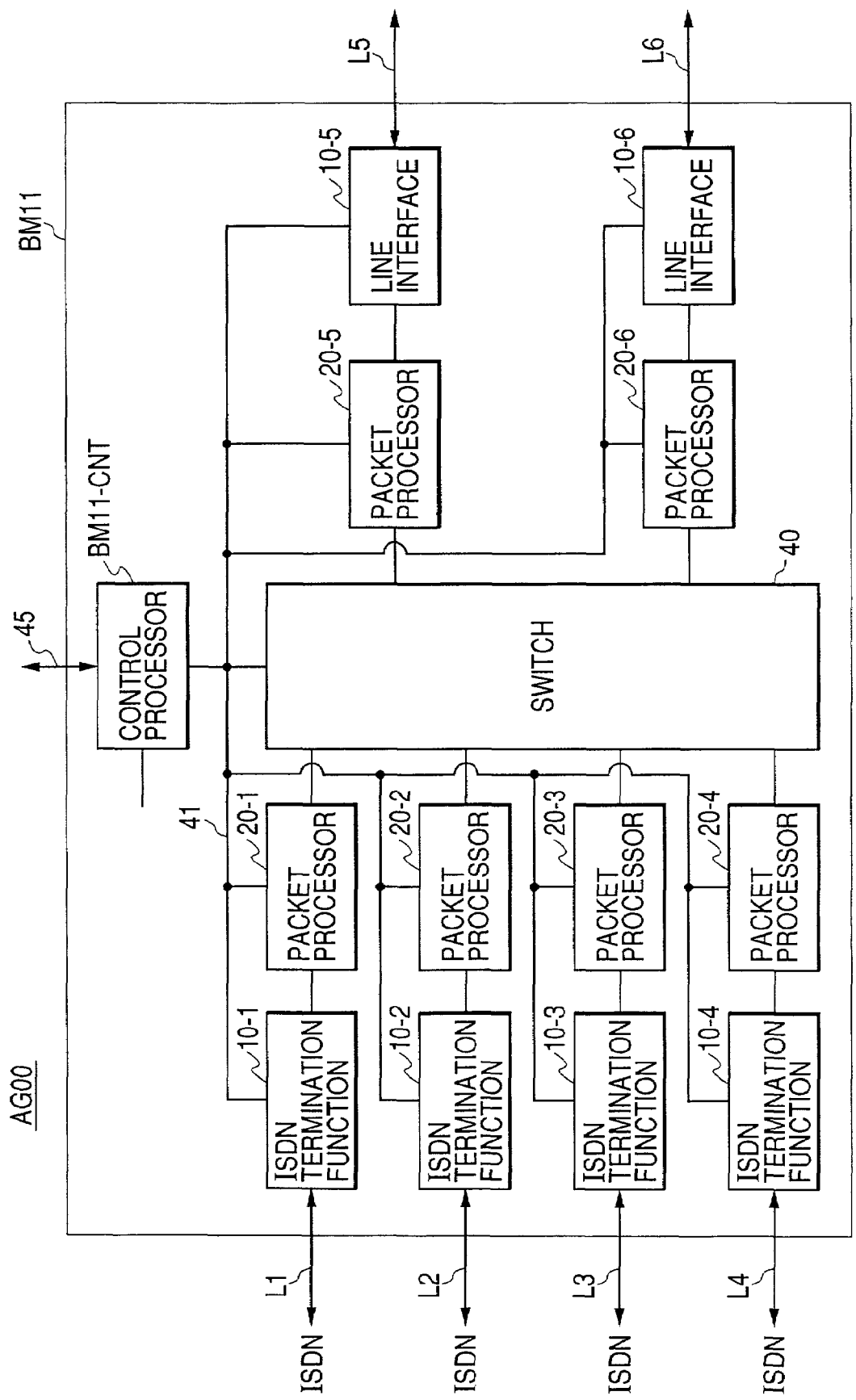
FIG. 2 is a diagram showing an example of the configuration of the access node to which the invention is applied.
Figure 3:
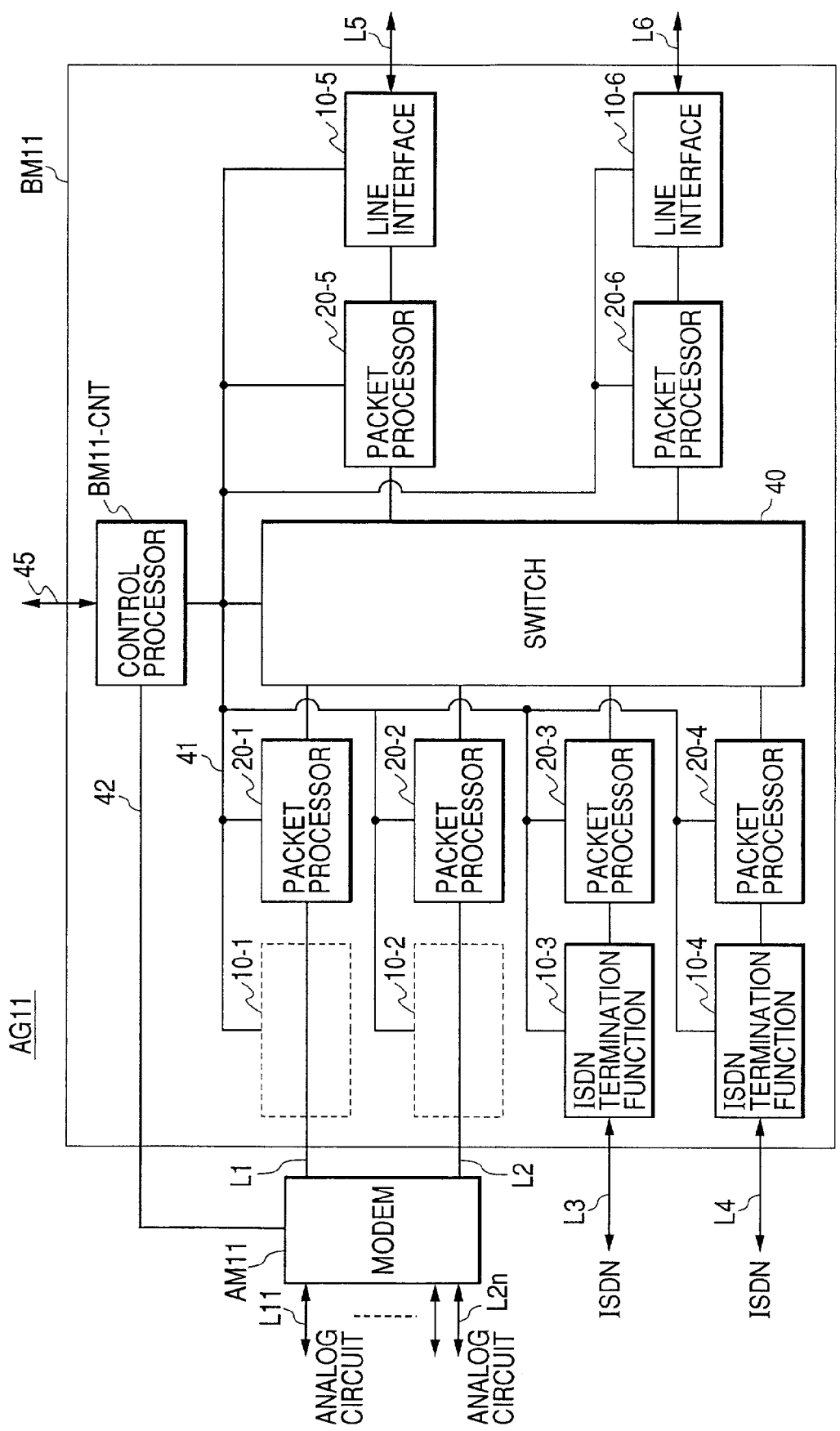
FIG. 3 is a diagram showing the configuration of an access node in which a part of a line interface in FIG. 2 is replaced by an additional module.

FIG. 2 shows the configuration of an access node AG00 for the ISDN circuit as a basic model. FIG. 3 shows the configuration of the access node AG11 in which a part of the ISDN circuit interfaces is replaced by the additional module AM11 having the modem function of the analog circuit.

As shown in FIG. 2, the access node AG00 as a basic model does not have an additional module but has only the basic module BM11. The basic module BM11 includes: line interfaces (ISDN termination function units) 10-1 to 10-4 connected to connection lines L1 to L4 for the ISDN circuit; packet processors 20-1 to 20-4 connected to the ISDN termination function units 10-1 to 10-4; line interfaces 10-5 and 10-6 connected to connection lines L5 and L6 for the ISP networks 61 and 62, respectively; packet processors 20-5 and 20-6 connected to the line interfaces 10-5 and 10-6; a switch 40 for switching packets with the packet processors 20-1 to 20-6; and a control processor BM11-CNT connected to the above elements via a control signal line 41. The control processor BM11-CNT is connected to a not-illustrated maintenance terminal via a control signal line 45. The ISDN termination function units 10-1 to 10-4 and the line interfaces 10-5 and 10-6 are formed as circuit boards independent of the packet processors 20-1 to 20-6 so as to be easily detached from the packet processors at the time of changing the node function.

In the case of using a part of connection lines for the ISDN circuits, for example, the connection lines L1 and L2 as connection lines for analog circuit networks, in the invention, as shown in FIG. 3, the ISDN termination function units 10-1 and 10-2 are taken out from the basic module BM11, the additional module (circuit board) AM11 having the modem function for accommodating the analog lines L11 to L2n is externally attached to the casing of the basic module BM11, and the additional module AM11 is connected to the packet processors 20-1 and 20-2 via the connection lines L1 and L2.

The additional module AM11 and the control processor BM11-CNT are connected to each other via a control signal line 42. In this case, the additional module AM11 does not always have to be placed adjacent to the access node casing accommodating therein the basic module BM11 but can be placed in an arbitrary position. The control signal line 42 may be branched from the control signal line 41. In FIG. 3, for simplicity, one additional module AM11 is connected to the two packet processors 20-1 and 20-2. The circuit board of the additional module AM11 may be independent for each processor.

Figure 4:
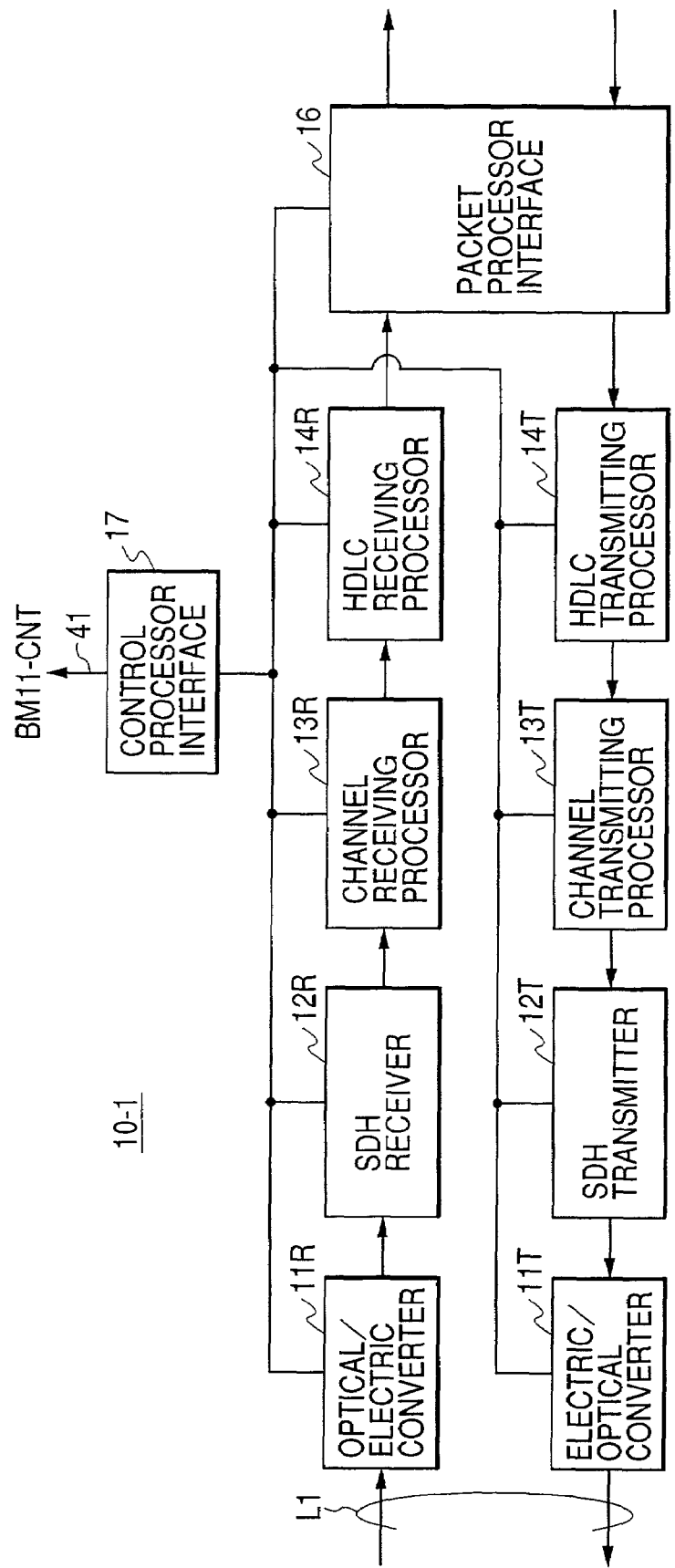
FIG. 4 is a diagram showing an example of the configuration of an ISDN termination function 10-1 in FIG. 2.

FIG. 4 shows an example of the configuration of the ISDN termination function unit 10-1. Each of the other ISDN termination function units 10-2 to 10-4 has a similar configuration.

The ISDN termination function unit 10-1 has an optical/electric converter 11R for converting an optical signal received from the ISDN circuit into an electric signal, an SDH receiver 12R for terminating an SDH (Synchronous Digital hierarchy) frame, a channel receiving processor 13R for extracting a multiplexed signal of 64 kbits/s from a time slot in a received signal, and a HDLC receiving processor 14R for terminating the received frame. The received packet output from the HDLC receiving processor 14R is input to the packet processor 20-1 shown in FIG. 2 via a packet processor interface 16.

On the other hand, a transmission packet received from the packet processor 20-1 is input to a HDLC transmitting processor 14T via the packet processor interface 16 to perform termination process of a transmission frame and supplied to a channel transmitting processor 13T. The transmission frame is multiplexed on the time slot of 64 Kbits/s through the channel transmitting processor 13T and output to an SDH transmitter 12T.

The SDH transmitter 12T converts the multiplexed signal into an SDH frame and outputs the SDH frame to an electric/optical converter 11T. The SDH frame is transmitted to the physical line L1 in a form of an optical signal.

Reference numeral 17 denotes a control processor interface for connection to the control processor BM11-CNT in the basic module BM11. The control processor BM11-CNT supplies control signals to elements in the ISDN termination function unit 10-1 via the interface 17 and controls the operation of the ISDN termination function.

Figure 5:
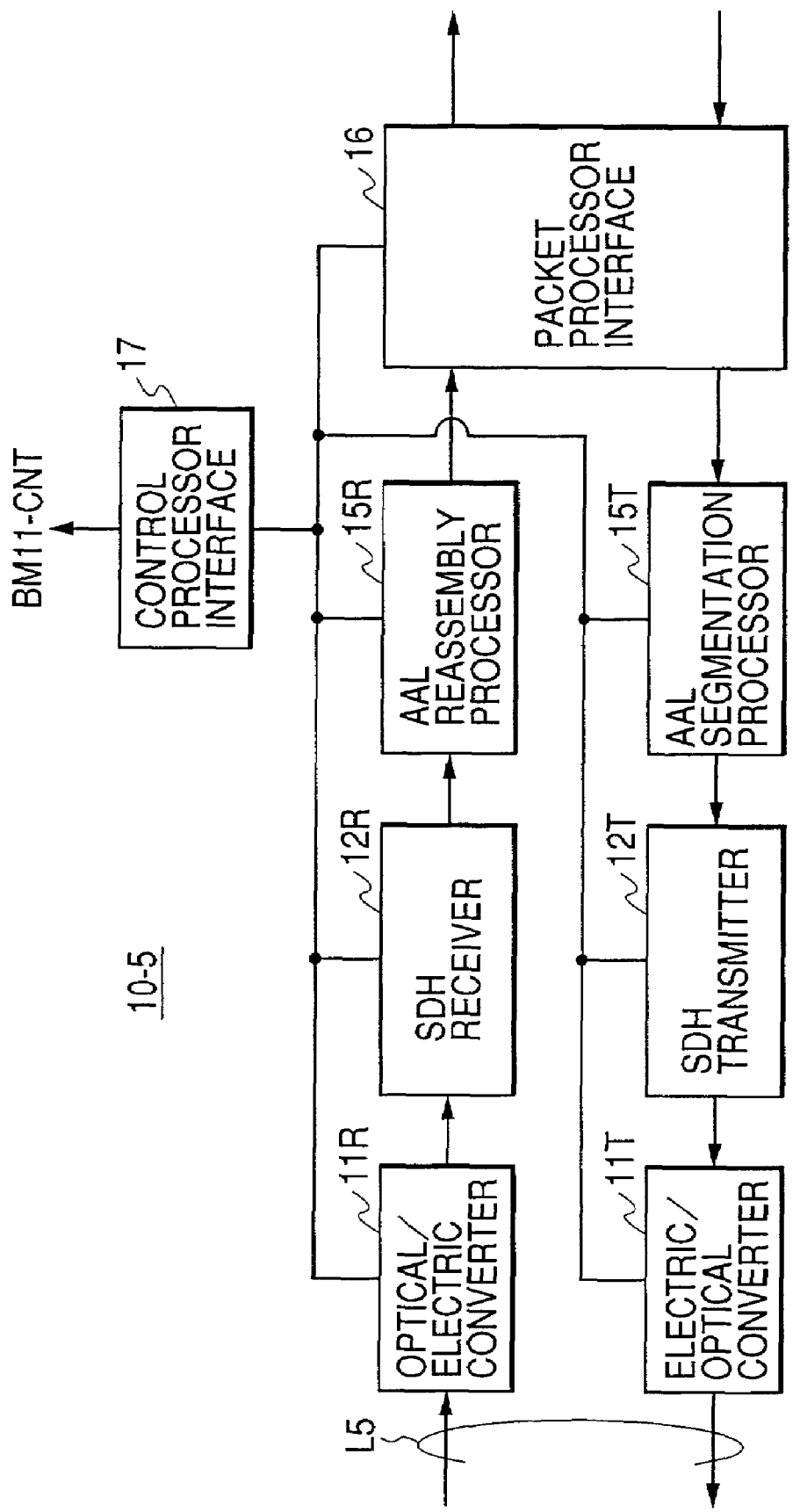
FIG. 5 is a diagram showing an example of the configuration of a line interface 10-5 in FIG. 2.

FIG. 5 shows an example of the configuration of the line interface 10-5 suitable in the case where ATM communication is adopted on the line connected to the ISP network.

The line interface 10-5 comprises: an optical/electric converter 11R for converting an optical signal received from a connection line L5 into an electric signal; a SDH receiver 12R connected to the optical/electric converter 11R, for terminating an SDH frame; an AAL reassembly processor 15R for assembling ATM cells multiplexed on the SDH frame into an AAL (ATM Adaptation Layer) frame; a packet processor interface 16 for outputting a received AAL frame to the packet processor 20-5 and receiving a transmission AAL frame from the packet transmitter 20-5; an AAL segmentation processor 15T for converting the transmission AAL frame to ATM cells; an SDH transmitter 12T for multiplexing ATM cells onto a SDH frame; the electric/optical converter 11T for converting the SDH frame into an optical signal and transmitting the optical signal to the connection line L5; and a control processor interface 17 for connection to the control processor BM11-CNT in the basic module BM11. These elements of the line interface 10-5 are controlled by the control processor BM11-CNT in a manner similar to the line interface 10-1.

Figure 6:
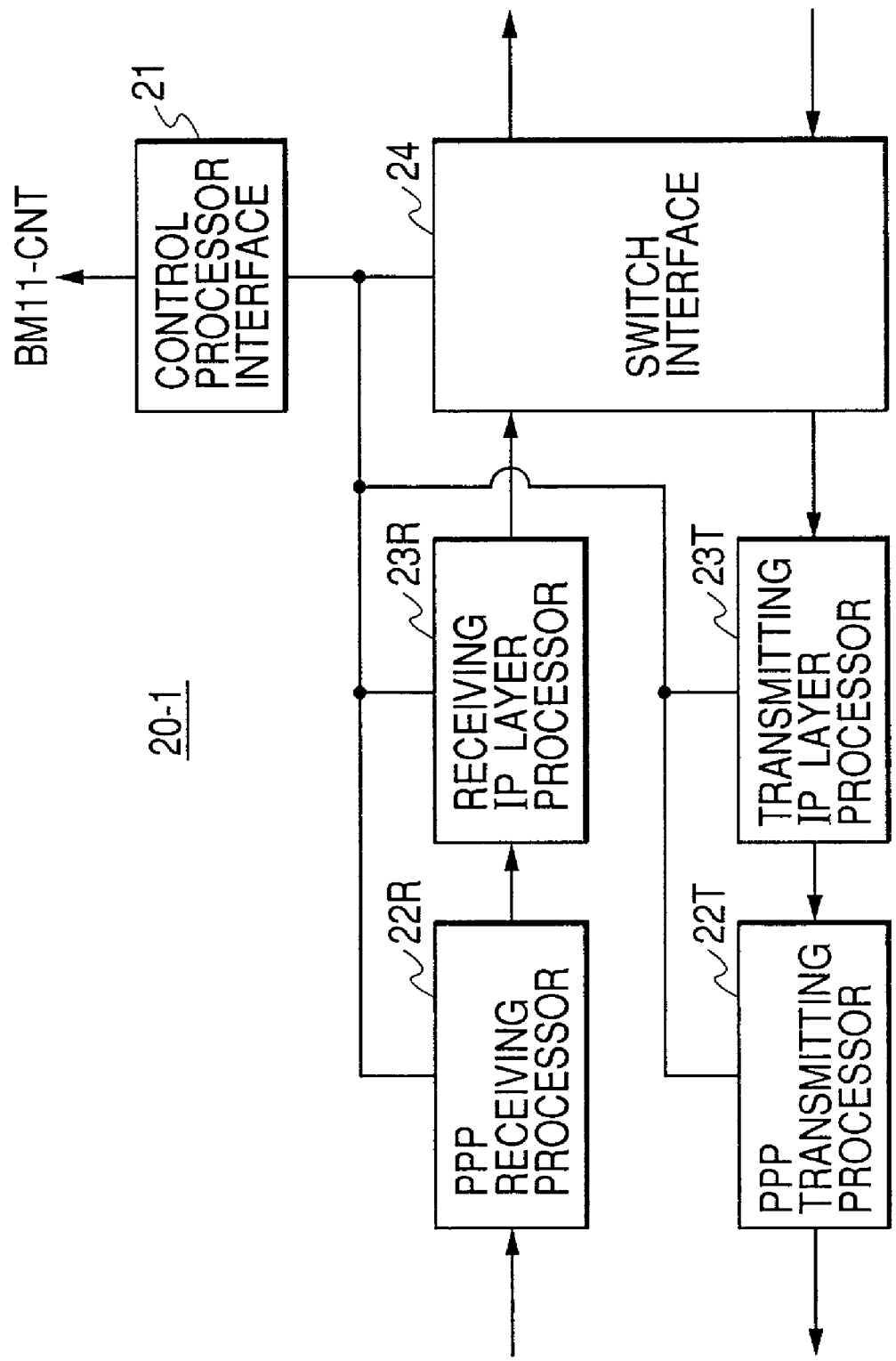
FIG. 6 is a diagram showing an example of the configuration of a packet processor 20-1 in FIG. 2.

FIG. 6 shows an example of the configuration of the packet processor 20-1. Each of the other packet processors 20-2 to 20-6 has a similar configuration.

The packet processor 20-1 comprises: a PPP receiving processor 22R for receiving packets from the ISDN termination function unit 10-1 and performing a process for a PPP session established between the user terminal and the access node AG11; a receiving IP layer processor 23R for performing an IP layer process on the received packets; a switch interface 24 for transmitting the received packets processed by the receiving IP layer processor 23R to the switch 40 and receiving transmission packets from the switch 40; a transmitting IP layer processor 23T for performing an IP layer process on the transmission packets received from the switch interface; a PPP transmitting processor 22T for performing a process for the PPP session on the transmission packets supplied from the transmitting IP layer processor 23T and outputting the packets to the ISDN termination unit 10-1; and a control processor interface 21 for connection to the control processor BM11-CNT in the basic module BM11. These elements of the packet processor 20-1 are controlled by the control processor BM11-CNT.

The receiving IP layer processor 23R has a routing table for determining a proper destination from destination information of the IP header attached to the received packets, and performs, as the IP layer process, a check on the IP header of the received packet, a TTL (Time To Live) subtraction, a routing table search, adding an internal header, and the like. After the IP layer process, the received packet is selectively transferred to the packet processor 20-5 or 20-6 in accordance with the internal header by the switch 40. The internal header of the transmission packet supplied from the switch 40 to the switch interface 24 is eliminated by the transmitting IP layer processor 23T.

Figure 7:
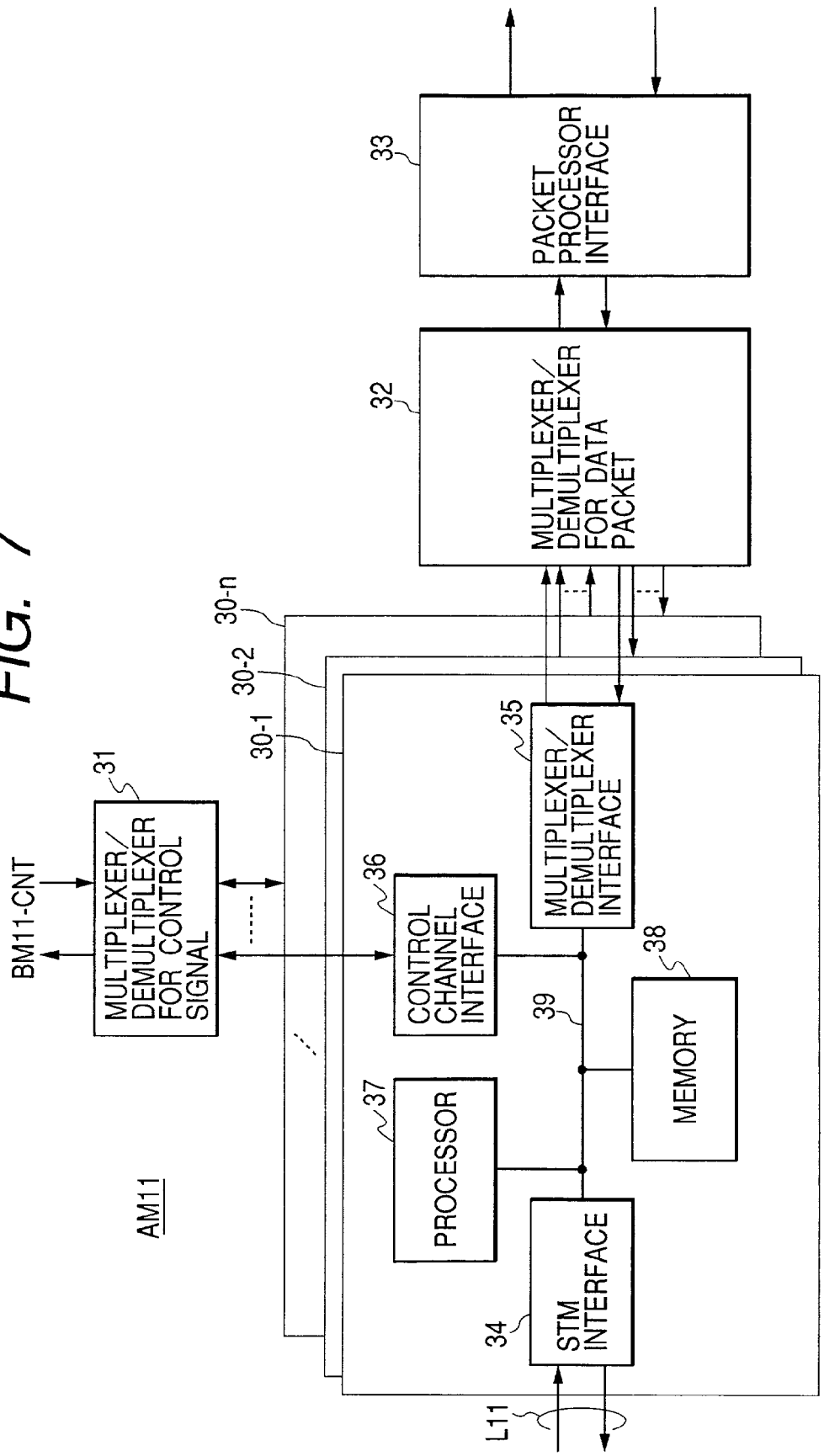
FIG. 7 is a diagram showing an example of the configuration of an additional module AM11 in FIG. 3.

FIG. 7 shows an example of the configuration of the additional module AM11 having a modem function.

The additional module AM11 comprises: a plurality of modem processing boards 30-1 to 30-n prepared in correspondence with analog circuits L11 to L1n, respectively; a multiplexer/demultiplexer (MUX/DMUX) 31 for a control signal; a multiplexer/demultiplexer (MUX/DMUX) 32 for a data packet; and a packet processor interface 33.

Each modem processing board 30-i (i=1 to n) includes: a physical line interface (STM interface) 34 connected to the analog circuit L1i; a multiplexer/demultiplexer (MUX/DMUX) interface 35 for connection to the multiplexer/demultiplexer 32 for a data packet; a control channel interface 36 for connection to the multiplexer/demultiplexer 31 for a control signal; a processor 37 for processing digital signals; a memory 38 serving as a work area of the processor and a data buffer; and an internal bus 39 for mutually connecting the above elements. The modem processes are realized by software of the processor 37 in a time sharing manner.

A dial-up signal (control signal or analog signal indicative of user information) input from each analog line L1i (i=1 to n) is received by the STM interface 34 and demodulated by the processor 37, and the demodulated signal is output as a digital signal from the interface 35. The digital signals output from each of the modem processing boards 30-1 to 30-n are multiplexed by the multiplexer/demultiplexer 32. The multiplexed signal is output to the packet processor 20-1 (or 20-2) shown in FIG. 3 via the interface 33.

The digital signal of the transmission packet input from the packet processor 20-1 (or 20-2) to the interface 33 is properly sent to any of the modem processing boards 30-1 to 30-n by the multiplexer/demultiplexer 32 and is input to the interface 35. In each modem processing board 30-i, the digital signal received by the interface 35 is demodulated to an analog signal by the processor 37, and the demodulated signal is transmitted to an analog circuit L1i via the STM interface 34.

The multiplexer/demultiplexer 31 for a control signal is connected to the control processor BM11-CNT in the basic module BM11 shown in FIG. 3 via the control signal line 42. A control signal (control packet) output from the control processor BM11-CNT is properly sent to each of the modem processing boards 30-1 to 30-n by the multiplexer/demultiplexer31. The control signal is input to the control channel interface 36, and notified to the processor 37.

The processor 37 operates in response to the control signal supplied from the control processor BM11-CNT. The status of each modem processing board detected by the processor 37 is notified to the control processor BM11-CNT via the control channel interface 36, multiplexer/demultiplexer 31, and control signal line 42.

Figure 8:
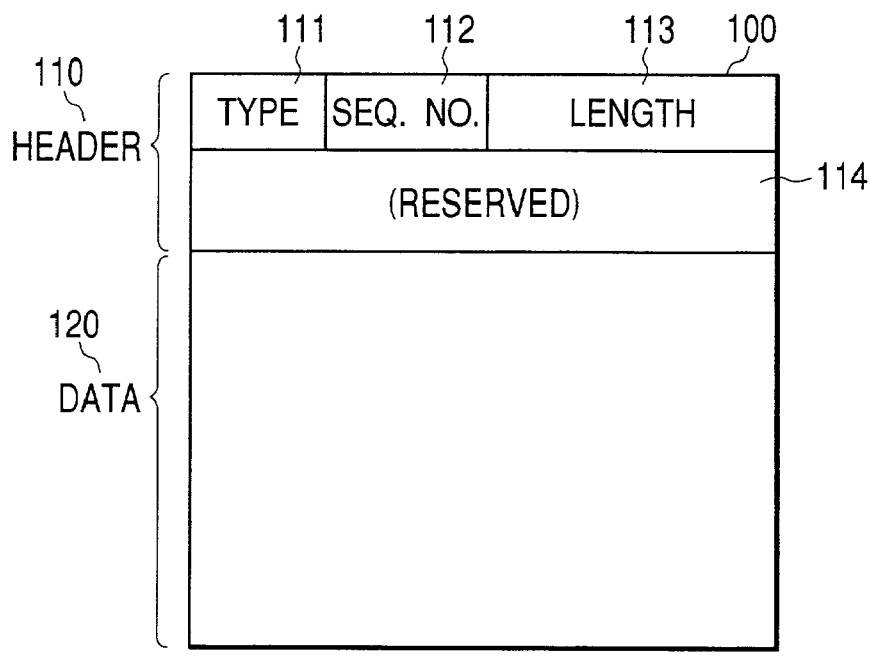
FIG. 8 is a diagram showing the format of a control packet.

FIG. 8 shows an example of the format of a control packet communicated between the basic module BM11 and the additional module AM11.

The control packet 100 is comprised of a header 110 and data field 120. The header 110 includes a field 111 indicative of the type of the packet, a field 112 indicative of a sequence number of the control packet, a field 113 indicative of a data length of the control packet, and a reserved field 114 for future use. In the data field 120, information necessary for the control is set.

Figure 9:
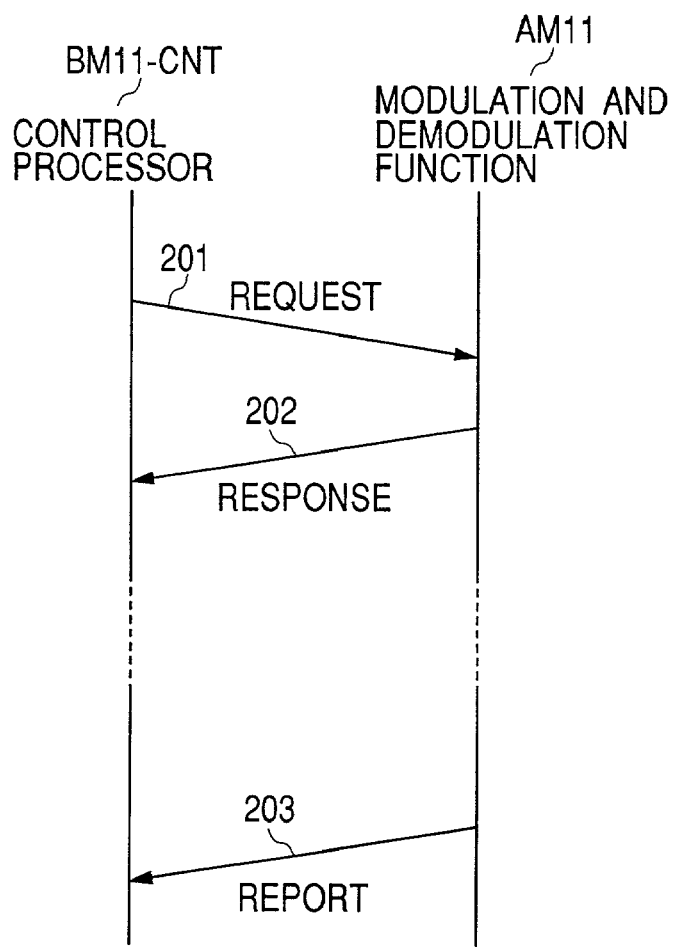
FIG. 9 is a diagram showing a control sequence between a basic module BM11 and the additional module AM11.

FIG. 9 shows a control sequence between the control processor BM11-CNT and the additional module AM11 performed via the control signal line 42.

The basic module BM11 and the additional module AM11 have a first control sequence in which a request 201 is issued from the control module BM11-CNT to the additional module AM11 and the additional module AM11 sends a response 202 to the request, and a second control sequence in which the additional module AM11 voluntarily sends a report information 203 to the control module BM11-CNT.

The first control sequence is executed, for example, in the case of setting control parameters to the additional module AM11 and collecting statistic information from the addition module AM11. In the case of collecting the statistic information, the request 201 for statistic information is transmitted periodically, for example, at intervals of a few minutes to tens minutes, from the control module BM11-CNT, and statistic data collected by the additional module AM11, for example, information such as the number of packets processed since the previous number has reported is sent back as the response 202.

In the second control sequence, trouble information detected by the processor 37, for example, a failure part and the type of a trouble occurred in a modem processing board is sent as the report information 203, thereby to notify to a terminal of a maintenance technician from the control module BM11-CNT via the control signal line 45. The maintenance technician recognizes the failure part on the basis of the report and deals with the failure in the additional module AM11.

In the example shown in FIG. 3, the control signal line 41 is used to communicate control information between the control processor BM11-CNT and the additional module AM11. The control information may be transferred via an in-channel passing through the switch 40 like a user packet.

In the foregoing embodiment, the additional module connected to the circuit on the subscriber terminal side has been described. In the invention, however, a special process can be also performed on a signal transmitted between the Internet and the access node by connecting the connection circuit on the Internet side to the basic module in the access node via the additional module. As a special process necessary for the connection line on the Internet side, for example, there is a packet encrypting process according to ESP (Encapsulating Security Payload) of an IPsec defined by RFC2406 of IETF.

In the case of encrypting the payloads of all packets transferred between the Internet and the access node, the hardware scale of the access node becomes large. However, with the configuration of using the access node AG11 shown in FIG. 2 proposed by the invention, detaching the interface 10-5 or 10-6 for a line requiring the encrypting process, and connecting an external interface board having a packet encrypting/decrypting function as an additional module, a special function can be easily provided on the access node of a small casing size.

Figure 10:
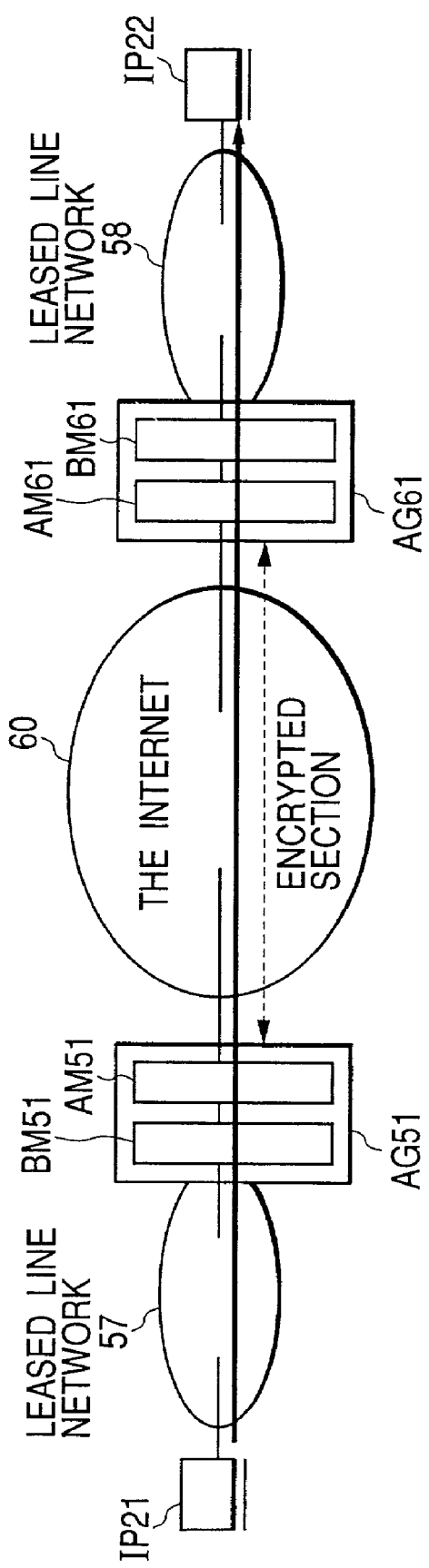
FIG. 10 is a diagram showing another configuration example of a network to which the access node according to the invention is applied.
Figure 12:
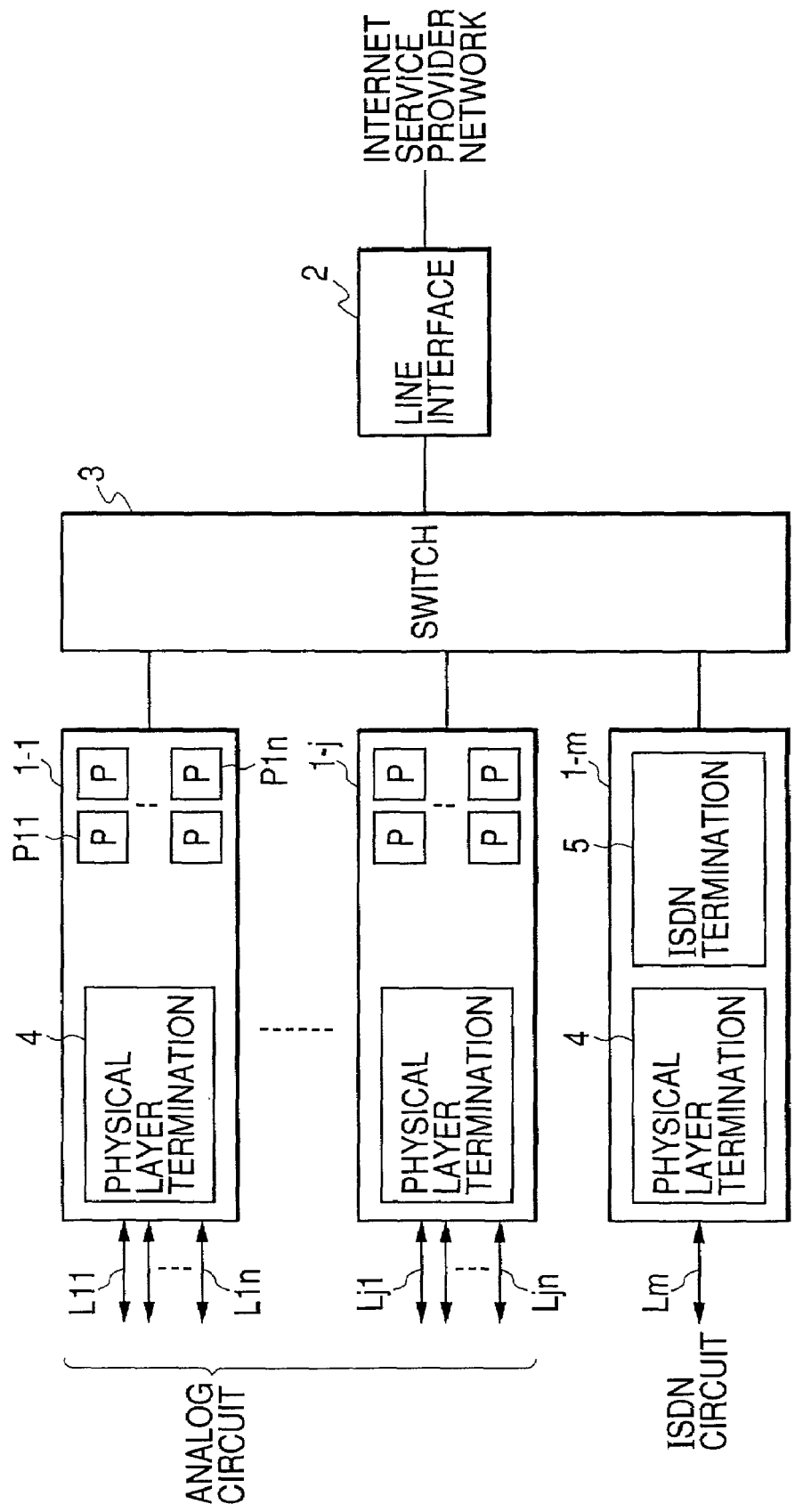
FIG. 12 is a diagram for explaining the configuration of a conventional access node.

FIG. 10 shows an example of the network architecture wherein communication packets are encrypted by the access node.

In the diagram, IP21 and IP22 denote subscriber terminals performing communications. A leased line network 57 to which the subscriber terminal IP21 is connected and the Internet 60 are connected via an access node AG51. A leased line network 58 to which the subscriber terminal IP22 is connected and the Internet 60 are connected via an access node AG61.

In the case of transmitting data from the subscriber terminal IP21 to the subscriber terminal IP22, processes as to PPP and IP layer are carried out through a basic module BM51 in the access node AG51, and data packets are encrypted through the additional module AM51. In the access node AG61, received data packets are decrypted through the additional module AM61 and, after that, the PPP process and the IP layer process are performed through a basic module BM61.

In this case, the interface board as each of the additional modules AM51 and AM61 has a structure in which, for example, in the line interface shown in FIG. 5, a decrypting processor is disposed between the AAL reassembly processor 15R and the packet processor interface 16, and an encrypting processor is disposed between the AAL segmentation processor 15T and the packet processor interface 16.

FIG. 11 shows, the relations among the type of access method 301, a function 302 on an additional module of the access node, a function 303 specific to service on the basic module, and a common function 304 on the basic module in the access node to which the invention is applied.

The additional module of the access node is provided with a modem function in the case of a dial-up access via an analog circuit, a processing function of the DSLAM in the case of an ADSL access, and a CMTS processing function for terminating a cable modem in the case of a CATV access. The basic module is provided with, as functions common to the access methods, functions of the PPP process, IP layer process, packet switching process, and control on the whole apparatus. Like the ISDN terminating process, such a function peculiar to the access method that requires a small size of hardware and supports an access method of high market needs is provided on a removable interface board and is housed as a function for each basic module into the access node casing.

In the above embodiment, in the case of accommodating a line of an access method different from that of an access method (for example, ISDN) supported by the basic module, a part of the interface boards housed in the basic module is detached and an additional module or a circuit board having a function peculiar to the new access method is externally attached to the casing.

The change in the function of the access node by using the additional module of the invention can be also applied as, for example, addition of a function of multiplexing a low-speed line such as a T1 line or E1 line on a high-speed line such as an STM1. A change in the access node function by the additional module maybe also performed not only for adaptation to another access method of the connection line but also for adaptation to a service provided by the Internet. For example, an access node used as a gateway of a VoIP needs the function of processing a large amount of data as a cause of enlargement in the system scale, such as various voice compressing functions and an echo canceling function. In this case, by executing the voice compression or the echo canceling process by the additional module, the market needs can be responded promptly by a small access node.

According to the invention, the casing of the packet transfer apparatus as a basic model can be reduced in size and the customer needs can be promptly responded by connecting the additional module prepared according to a requested access method or a service type to the basic model.

What is claimed is:

1. A packet switching apparatus accommodating a group of first communication lines of different access methods for performing communication with subscriber terminals and a second communication line for connection to the Internet, comprising:
   a basic module disposed in the packet switching apparatus casing; and
   an additional module disposed on the outside of the packet switching apparatus casing, and said basic module comprising:

a plurality of packet processors each for performing a predetermined protocol process on communication packets;

a switch for switching packets among said packet processors;

at least one detachable first line interface connected between one of said packet processors and a communication line having a specific access method in said first communication lines;

a second line interface connected between one of said packet processors and said second communication line; and a control processor operatively connected to control the basic module and the additional module, wherein said additional module is operatively connected to one of said packet processors instead of a first line interface so as to accommodate at least one communication line having an access method different from said specific access method in said first communication lines and performs a process peculiar to said access method on a transmission and received signal.

2. The packet switching apparatus according to claim 1, wherein one of said packet processors has a PPP (Point to Point Protocol) process function and an IP (Internet Protocol) layer processing function for performing communication with an Internet service provider.

3. The packet switching apparatus according to claim 1, wherein the communication line having said specific access method is an ISDN.

4. The packet switching apparatus according to claim 1, wherein the communication line connected to said additional module is any of an analog circuit, an ADSL (Asymmetric Digital Subscriber Line), and a CATV line.

5. The packet switching apparatus according to claim 1, wherein said additional module has means for communicating control information with said control processor.

6. The packet switching apparatus according to claim 1, wherein said first line interface is detachably connected to said packet processor.

7. A packet switching apparatus accommodating first communication lines connected to subscriber terminals and a second communication line connected to the Internet, comprising:

a basic module disposed in the packet switching apparatus casing; and an additional module disposed on the outside of the packet switching apparatus casing, and said basic module comprising:

a plurality of packet processors each for performing a predetermined protocol process on communication packets;

a switch for switching packets among said packet processors;

at least one detachable line interface operatively connected with one of said packet processors and one of said first communication lines; and a control processor operatively connected to control the basic module and the additional module, wherein said additional module is operatively connected to one of said packet processors instead of a standard line interface for said second communication line and has an expanded function including a packet processing function peculiar to communication service on said second communication line.

8. The packet switching apparatus according to claim 7, wherein said additional module has means for encrypting and decrypting the contents of packets communicated on said second communication line.

* * * * *